United States Patent [19]

Mack et al.

[11] Patent Number: 5,098,559

[45] Date of Patent: Mar. 24, 1992

[54] LIQUID FILTER FOR THE LUBRICATING OIL OF AN INTERNAL COMBUSTION ENGINE

[75] Inventors: Klaus Mack, Asperg; Jaroslav Pavlin, Freiberg, both of Fed. Rep. of Germany

[73] Assignee: Filterwerk Mann & Hummel GmbH, Ludwigsburg, Fed. Rep. of Germany

[21] Appl. No.: 592,452

[22] Filed: Oct. 2, 1990

[30] Foreign Application Priority Data

Oct. 4, 1989 [DE] Fed. Rep. of Germany ....... 3933059

[51] Int. Cl.⁵ .............................................. B01D 27/10
[52] U.S. Cl. .................... 210/130; 210/248; 210/440
[58] Field of Search ............... 210/130, 133, 232, 234, 210/238, 248, 443, 440, 435

[56] References Cited

U.S. PATENT DOCUMENTS 4,906,365  3/1990  Baumann et al. ............... 210/238

FOREIGN PATENT DOCUMENTS 314915   5/1989   European Pat. Off. .
3422482  12/1985  Fed. Rep. of Germany .
2162079  1/1986   United Kingdom .

*Primary Examiner*—W. Gary Jones
*Assistant Examiner*—Matthew O. Savage
*Attorney, Agent, or Firm*—Foley & Lardner

[57] ABSTRACT

A liquid filter for cleaning the lubricating oil of an internal combustion engine which comprises a vertically upstanding filter housing 10 closed at the top by a removable cover 12. In this filter housing there is a filter insert 18 which is removable for maintenance and separates a dirty liquid chamber 41 from a filtrate chamber 42 in the filter housing. When the cover 12 is opened and the filter insert 18 is removed, the liquid drains out through a drain passageway 17. This drain passageway 17 is provided with a shut-off device 25 which shuts off the drain passageway 17 when the filter insert 18 is installed, and which opens this drain passageway 17 when the filter insert 18 is loosened. The shut-off device 25 is a compact unit which can be mounted and inspected outside the filter housing 10, and can be used for filter housings of various sizes.

7 Claims, 3 Drawing Sheets

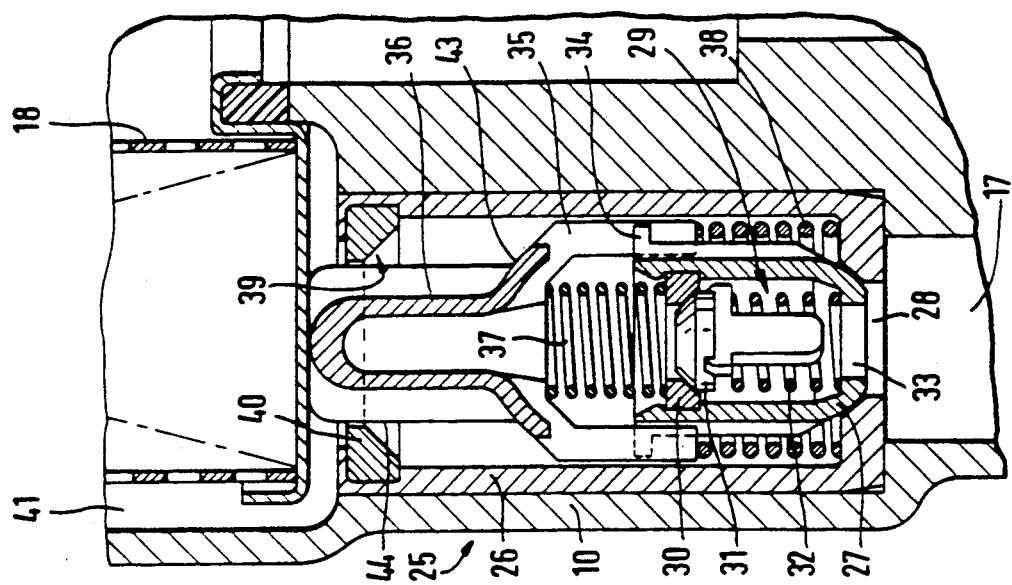
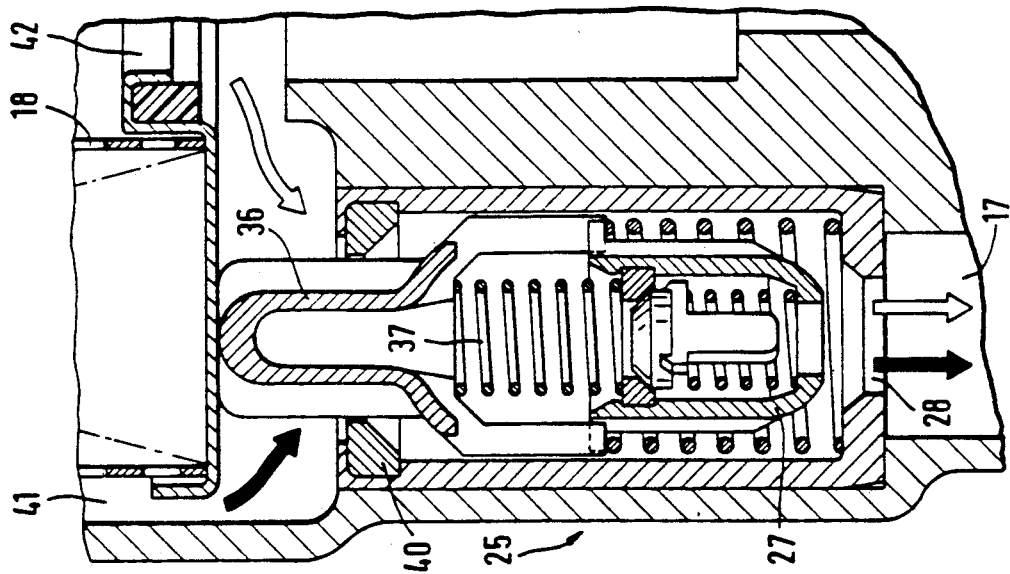
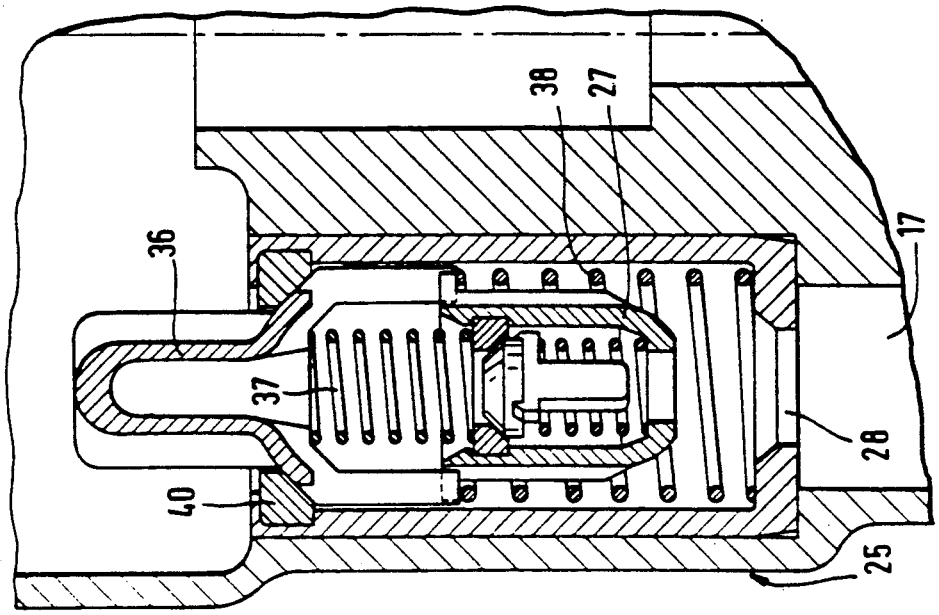

LIQUID FILTER FOR THE LUBRICATING OIL OF AN INTERNAL COMBUSTION ENGINE

BACKGROUND OF THE INVENTION

This invention relates to a liquid filter for cleaning the lubricating oil of an internal combustion engine with a filter housing closed by a removable cover; an annular filter insert which is removable for maintenance, through which liquid to be filtered flows radially, and which separates a dirty liquid chamber from a filtrate chamber in the filter housing; a dirty liquid passageway for delivering liquid to be filtered; a drain passageway leading from the filter housing to a liquid collecting container, and a shut-off device associated with the drain passageway for opening the drain passageway when the filter housing cover is loosened and the filter insert is removed, the shut-off device comprising a first valve which shuts off the drain passageway via a spring when the filter housing cover is closed and the filter insert is installed.

With liquid filters of this kind the spilling of the liquid when the filter housing cover is removed is prevented by the fact that the filter insert, which is held in its installed position by the cover, is moved outwardly with the cover and a shut-off device automatically opens the drain passageway so that the liquid situated in the filter housing can flow down into a liquid collecting container.

Published German Patent Application No. DE-OS 34 22 482 discloses such a lubricating oil filter. A shut-off device is integrated into the filter housing. This shut-off device is a combination valve comprising a shut-off valve and a bypass valve. It has been found that such a shut-off device, which consists of a plurality of valve parts springs etc., is rather difficult to install in the filter housing. Furthermore, a number of sealing surfaces have to be provided in the filter housing and must cooperate with the shut-off device. All in all, therefore, this known combination valve disposed in the liquid filter is an apparatus which is difficult to manufacture.

Published European Patent Application No. EP 314,915 discloses a liquid filter which likewise opens up a passageway to drain the liquid when the filter housing is opened. This drain passageway can be closed by a valve body which is supported by two inserted compression springs. This approach is less costly, yet with this arrangement there is the danger that a spring may stick so that a good seal may not be assured when the filter insert is installed. Faulty sealing of the drain passageway can result in an inadequate supply of oil to the motor.

Another disadvantage of this arrangement is to be seen in the fact that a precise matching of the springs is necessary if the valve body is to perform its task. Furthermore, the filter housing must here again be provided with sealing and attachment surfaces, thereby increasing the cost of production.

SUMMARY OF THE INVENTION

It is therefore the object of the present invention to provide a shut-off device which is reliable in operation and can be integrated in the filter housing in a simple manner without increasing the cost of production.

These and other objects are achieved by providing a liquid filter for cleaning the lubricating oil of an internal combustion engine, comprising a filter housing which is closed by a removable cover; an annular filter insert which is removable for maintenance and through which liquid to be filtered flows radially, the filter insert separating a dirty liquid chamber from a filtrate chamber in the filter housing; a dirty liquid passageway for delivering liquid to be filtered; a drain passageway leading from the filter housing to a liquid collecting container; and a shut-off device disposed in the drain passageway for opening the drain passageway when the filter housing cover is loosened and the filter insert is displaced outwardly or removed, the shut-off device comprising a first valve which shuts off the drain passageway via a spring when the filter housing cover is closed and the filter insert is installed, wherein the shut-off device is surrounded by a cylindrical valve housing, and a valve body is guided for axial movement in the valve housing as the first valve, the valve body cooperating with a valve seat disposed on the valve housing and being actuated by the filter insert through an equalizing spring and a plunger, the plunger being guided in the valve housing, and a spring being provided which rests at one end against the valve housing and resiliently urges the plunger against the filter insert.

In accordance with an alternative embodiment of the invention the objects are achieved by providing a liquid filter for cleaning the lubricating oil of an internal combustion engine, comprising a filter housing which is closed by a removable cover; an annular filter insert which is removable for maintenance and through which liquid to be filtered flows radially, the filter insert separating a dirty liquid chamber from a filtrate chamber in the filter housing; a dirty liquid passageway for delivering liquid to be filtered; a drain passageway leading from the filter housing to a liquid collecting container; and a shut-off device associated with the drain passageway for opening the drain passageway when the filter housing cover is loosened and the filter insert is displaced outwardly or removed, the shut-off device comprising a first valve which shuts off the drain passageway via a spring when the filter housing cover is closed and the filter insert is installed, and wherein the shut-off device is surrounded by a cylindrical valve housing, and a valve body is guided for axial movement in the valve housing, the valve body cooperating with a valve seat disposed on the valve housing in order to close the drain passageway and being actuated by the filter insert through an equalizing spring and a plunger, the plunger being guided in the valve housing, and a compression spring being provided which rests at one end against the valve housing and at its other end exerts a force on the valve body which acts in the direction of the filter insert.

An important advantage of the invention is to be seen in the fact that the shut-off device now is a compact unit which can be manufactured, assembled and inspected outside of the filter housing. In particular, the testing of the operability of the shut-off device can be performed much more easily on the complete unit.

The installation of the shut-off device in the filter housing takes very little time. Also, no special sealing surfaces or surfaces for connecting certain elements of the shut-off device are needed in the filter housing.

Another advantage of the invention resides in the fact that, if some defect occurs in the shut-off device, it can be easily replaced.

In accordance with a further aspect of the invention, a safety valve is incorporated in the valve body, and consequently in the shut-off device. Installation of this safety valve is simplified by constructing the shut-off device in accordance with the invention. Testing the safety valve at the maximum pressure is facilitated by the easy accessibility of this valve from the outside of the filter housing.

According to another advantageous embodiment of the invention, the shut-off device is also able to shut off the drain passageway in spite of the absence of a filter insert. This is especially desirable when the motor must be able to run, at least briefly, even without a filter insert. For this purpose the plunger is provided with an annular shoulder surface which in the absence of a filter insert engages a sealing surface on the valve housing and thus closes off the drain passageway from the filter housing.

The operability of this valve can, of course, be checked before the shut-off device is installed in the filter housing.

If the filter housing is appropriately configured, the shut-off device can, for example, be threaded into the filter housing. Of course, other fastening methods are conceivable, including press fitting or cementing.

The alternate embodiment of the invention exhibits an especially simple and reliable valve configuration. This valve also has a compact and easily replaceable design.

In one embodiment of this variant, axial movement of the plunger is limited by means of a crimped margin on the valve housing.

An advantageous further development of this invention is also to be seen in the fact that the compression spring is so designed that it can reliably shift the valve to its open position, but at the same time assures that, when the filter insert is installed, thereby applying a force to the plunger, the plunger will move the valve body by means of the stronger equalizing spring to the closed position, and the valve will remain closed in normal operation.

The compression spring is furthermore so designed that, if the filter insert is missing and the oil pressure is rising inside the filtrate chamber, the valve will close, so that even without the filter insert the motor to which the oil filter is applied will be able to operate.

BRIEF DESCRIPTION OF THE DRAWINGS

The invention will be explained in further detail hereinafter with reference to illustrative embodiments shown in the accompanying drawings in which:

FIG. 2 is a detail view of a shut-off device with the filter insert installed;

FIG. 3 is a view of the shut-off device during removal of the filter insert;

FIG. 4 is a view of the shut-off device with the filter insert entirely removed.

DETAILED DESCRIPTION OF PREFERRED EMBODIMENTS

Figure 1:
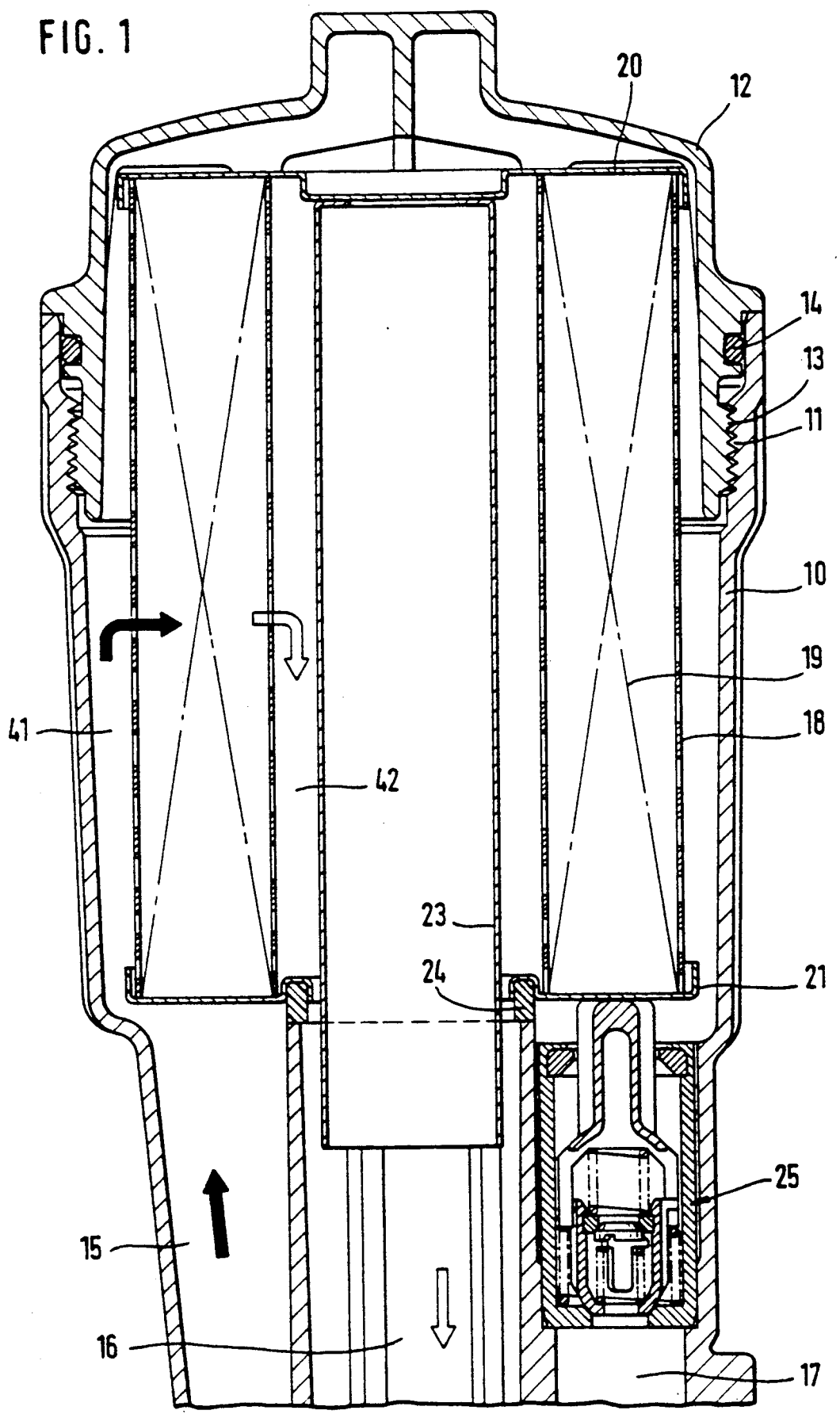
FIG. 1 is a diagrammatic representation of a liquid filter in axial section.

The liquid filter according to FIG. 1 comprises a vertically upright, substantially cylindrical filter housing 10 which is provided at its upper, open end with an internal thread 11. A removable cover 12 is threaded with its external thread 13 into the thread 11 of the filter housing and seals the filter housing 10 by means of an annular gasket 14 which engages the inside surface of the filter housing 10.

At its bottom end the filter housing 10 is provided with a dirty liquid passageway 15 through which the liquid to be filtered is fed, a filtrate passageway 16 for carrying away the filtered liquid, and with a drain passageway 17 which leads to a liquid collecting container which is not shown here. If the liquid filter is used for the lubricating oil of an internal combustion engine, the drain passageway may be connected to the oil pan of the engine.

An annular filter insert 18 consists of a pleated filter paper ring 19 which is closed at its upper end by an adhesively attached end plate 20, and at its bottom end by a cover ring 21 also attached by an adhesive. At the bottom end a tubular inside part 23 of the filter insert 18 extends into the filtrate passageway 16. The filtrate passageway is sealed off from the dirty oil passageway by a gasket 24 which is fastened concentrically on the cover ring 21. The drain passageway 17 is provided with a shut-off device 25; this shut-off device is actuated by the installation or removal of the filter insert 18. The construction and manner of operation of this shut-off device is explained further in the following figures.

As shown in FIG. 2, the shut-off device 25 consists of a valve housing 26 which is inserted into the filter housing 10. In this valve housing there is disposed a valve body 27 which can close the bottom port 28 of the valve housing 26. A safety valve 29 is integrated into the valve body 27. This safety valve consists of a valve seat 30, a valve body 31, and a compression spring 32. In conjunction with the valve seat 30, the valve body 31 in normal operation closes a safety opening 33 in the valve body 27. If for any reason the oil pressure in the filter housing should rise above a specific value, this safety valve 29 opens until the excess pressure is dissipated.

By means of radially outwardly extending projections 34, the valve body 27 engages longitudinal guides 35 of a plunger 36. The purpose of this plunger is to transfer the movement of the filter insert 18 to the valve body 27. The axial component of the movement of the plunger 36 is transmitted to the valve body 27 through a spring 37 which serves to equalize differences in length. A spring 38 is also provided, which rests against the valve housing 26 and exerts an upward force against the plunger 36, so that the plunger is always in contact with the installed filter insert 18. The equalizing spring 37 has a higher spring constant than the compression spring 38. To guide the plunger 36 within the valve housing 26, the plunger has guiding surfaces 44 in a star arrangement at the upper end of the plunger. At its bottom the plunger 36 is supported by its outer surface against the inside of the valve housing 26.

At the upper end of valve housing 26 there is an additional valve seat 40 which is provided with a sealing surface 39. This valve seat 40 cooperates with an annular shoulder 43 of the plunger 36. The function of this seal is explained further below in connection with FIG. 4.

In FIG. 2 the filter insert 18 is in the installed position, i.e., the filter housing cover 12 is screwed on and forces the filter insert 18 to its bottom-end position. In this position the plunger 36 urges the valve body 27 via the spring 37 against the port 28 of the valve housing 26 and thus effectively shuts off the drain passageway 17 from the dirty oil chamber 41.

When the filter housing cover 12 is loosened, the filter insert 18 is pushed up by the plunger 36 which in turn is raised by means of the spring 38.

FIG. 3 shows a position of the filter insert 18 in which the filter housing cover is partially unscrewed. In the illustrated position, the valve body 27 has uncovered the port 28, so that the dirty liquid now can flow out of the dirty liquid chamber 41, and the liquid can flow unhampered out of the clean side 42 through the drain passageway 17. This drainage takes place immediately after the filter housing cover 12 has opened far enough that air can enter between the filter housing cover and the filter housing, and the filter insert 18 has been raised up enough to uncover the port 28 of the drain passageway 17. The liquid in the filter housing can all drain out before the cover is completely removed and the filter insert 18 can be taken out.

In FIG. 4 the shut-off device 25 is shown with the filter insert 18 removed. The absence of a filter insert causes the spring 38 to move the plunger 36 upward until the shoulder-like sealing surface 43 of the plunger engages the valve seat 40 and thus closes the drain passageway 17. This sealing of the drain passageway from the inner chamber of the filter housing makes it possible for the engine to run even though the filter insert is missing, that is, even then a liquid pressure can build up, in which case the liquid is not filtered, but the circulation of the liquid is maintained.

The spring 38 is of course made such that any desired operating pressure which is to be created by the liquid in the filter housing will not be able to open the shut-off valve formed by the plunger.

The valve housing 26 can be completely assembled outside of the filter housing 10. Moreover, it is also possible to test the operation of the individual valves which are disposed in the valve housing, prior to installation in the filter housing 10. Since it is universally usable, the complete shut-off device can be manufactured in large quantities and therefore at low cost. The shut-off device is inserted into the filter housing 10, for example, by force fitting, screwing, snapping it in or cementing.

Figure 5:
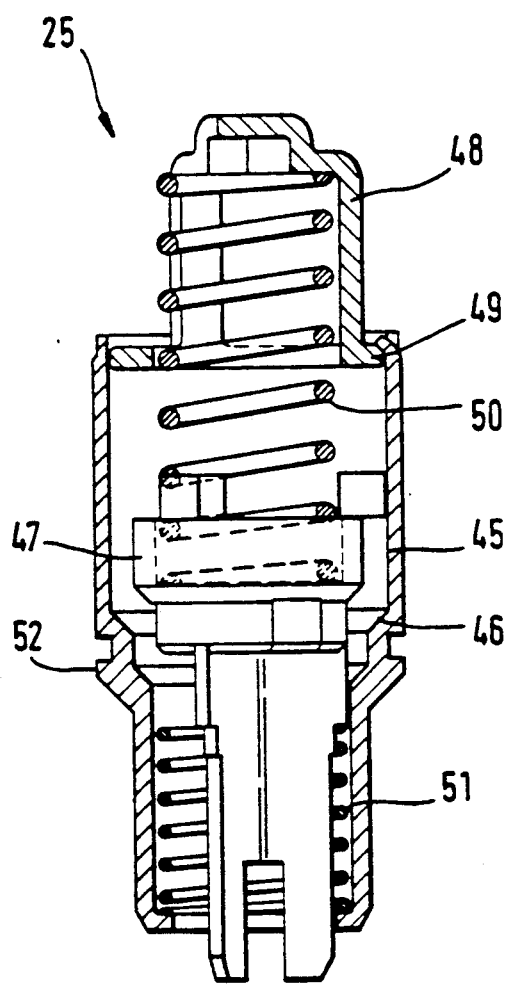
FIG. 5 is a diagrammatic representation of another shut-off device.

The shut-off device according to FIG. 5 has a valve housing 45 which is provided with a conically shaped valve seat 46 disposed on a conical surface of a central bore in the housing. Inside of the valve housing there are a valve body 47 and also a plunger 48. This plunger is supported at its bottom end by a flange 49 against the inside surface of the valve housing. The valve housing is crimped at its upper end at at least three points so as to limit the axial movement of the plunger 48. An equalizing spring 50 is disposed between the plunger 48 and the valve body 47. This equalizing spring is configured as a compression spring. Another compression spring 51 is situated on the opposite side of the valve body 47 between the valve housing 45 and the valve body. The compression spring 51 has a lower spring coefficient than the equalizing spring 50. The spring force of this compression spring 51 is furthermore selected such that the oil pressure that usually prevails within the filtrate chamber is capable of closing the valve. This assures that even if the filter insert is missing, there will be no disruption of the oil supply. Valve housing 45 may be formed of an aluminum material and is provided on its outer circumference with a press-fit surface 52 for pressing the valve housing into the drain passageway. The valve body 47 has at its bottom and top ends guiding surfaces which rest against inside surfaces of the valve housing 45 and thus fix the valve body 47 in its radial position. Valve body 47 has a slightly spherical surface which lies against the conical surface of valve seat 46.

The foregoing description and examples have been set forth merely to illustrate the invention and are not intended to be limiting. Since modifications of the described embodiments incorporating the spirit and substance of the invention may occur to persons skilled in the art, the scope of the invention should be construed to include all modifications falling within the ambit of the appended claims and equivalents thereof.

What is claimed is:

1. A liquid filter for cleaning the lubricating oil of an internal combustion engine, said filter comprising:
   a filter housing defining a filter chamber, a dirty liquid inlet leading to said filter chamber, a filtrate outlet leading from said filter chamber, a drain passageway, and a shut-off valve chamber interposed between said filter chamber and said drain passageway such that said drain passageway communicates with said filter chamber through said shut-off valve chamber;
   a removable cover for closing said filter chamber;
   a replaceable annular filter insert through which liquid to be filtered flows radially, said filter insert being disposed in said filter chamber and dividing said filter chamber into a dirty liquid chamber into which said dirty liquid inlet leads and a filtrate chamber from which said filtrate outlet leads; and
   a shut-off valve assembly comprising:
      a cylindrical valve housing received in said shut-off valve chamber,
      a first valve body axially movable within said valve housing between a closed position in which said valve body engages a valve seat at one end of said valve housing and an open position in which said valve body is spaced from said valve seat,
      a plunger axially displaceable within said valve housing having a projection extending through the other end of said valve housing toward said filter chamber and engaging said filter insert disposed in said filter chamber,
      an equalizing spring interposed between said first valve body and said plunger, and
      a valve spring interposed between said valve housing and said first valve body for urging said first valve body toward said open position, said valve spring
   having a lower spring constant than said equalizing spring;
   whereby, when said filter insert is positioned in said filter chamber, said plunger will be displaced by said filter insert and the displacement will be transmitted through said equalizing spring to said first valve body to urge said first valve body into said closed position, and when said filter insert is removed, said valve spring will urge said first valve body toward said open position to open said drain passageway.

2. A liquid filter according to claim 1, wherein a second valve seat is disposed in said first valve body, a second valve body is provided inside said first valve body, said second valve body contacting said second valve seat and forming a safety valve therewith, and a compression spring is interposed between said first valve body and said second valve body to urge said second valve body into contact with said second valve seat.

3. A liquid filter according to claim 1, wherein said plunger (36) has an annular shoulder (43), and a sealing surface (39) is provided on said cylindrical valve housing (26), and after complete removal of the filter insert (18), said annular shoulder (43) lies against said sealing surface (39) and shuts off said drain passageway (17) from said filter housing (10).

4. A liquid filter according to claim 1, wherein said cylindrical valve housing of said shut-off valve assembly is pressed or cemented into said shut-off valve chamber in said filter housing.

5. A liquid filter according to claim 1, wherein said valve housing is formed of an aluminum material and is provided on its outer circumference with a press-fit surface for the pressing of the valve housing into the shut-off valve chamber.

6. A liquid filter according to claim 1, wherein said plunger is guided on an inside surface of said valve housing, and said valve housing has a crimped margin at its upper end for limiting axial movement of said plunger.

7. A liquid filter according to claim 1, wherein said valve seat has a conical surface and is disposed in a central bore in said valve housing, and wherein said first valve body has a slightly spherical surface which lies against said conical surface of said valve seat.

* * * * *